(12) United States Patent
Huth

(10) Patent No.: US 8,096,568 B2
(45) Date of Patent: Jan. 17, 2012

(54) HYDROPNEUMATIC AXLE SUSPENSION FOR VEHICLES

(75) Inventor: Heinz-Peter Huth, Überherm (DE)

(73) Assignee: Hydac System GmbH, Sulzbach/Saar (DE)

( * ) Notice: Subject to any disclaimer, the term of this patent is extended or adjusted under 35 U.S.C. 154(b) by 348 days.

(21) Appl. No.: 12/085,685

(22) PCT Filed: Sep. 23, 2006

(86) PCT No.: PCT/EP2006/009260
§ 371 (c)(1),
(2), (4) Date: May 29, 2008

(87) PCT Pub. No.: WO2007/073786
PCT Pub. Date: Jul. 5, 2007

(65) Prior Publication Data
US 2009/0261541 A1    Oct. 22, 2009

(30) Foreign Application Priority Data

Dec. 24, 2005   (DE) .................. 10 2005 062 246

(51) Int. Cl.
*B60G 11/30* (2006.01)
(52) U.S. Cl. .......... 280/124.16; 280/6.159; 280/124.161
(58) Field of Classification Search .......... 280/124.158, 280/124.159, 6.159, 124.16, 124.161
See application file for complete search history.

(56) References Cited

U.S. PATENT DOCUMENTS

| | | | | |
|---|---|---|---|---|
| 4,971,353 A * | 11/1990 | Buma et al. | ........... | 280/5.514 |
| 5,338,010 A * | 8/1994 | Haupt | ........... | 267/64.16 |
| 6,394,238 B1 * | 5/2002 | Rogala | ........... | 188/266.2 |
| 6,575,484 B2 * | 6/2003 | Rogala et al. | ........... | 280/124.158 |
| 6,752,403 B2 * | 6/2004 | Allen et al. | ........... | 280/6.157 |
| 7,048,280 B2 * | 5/2006 | Brandenburger | ........... | 280/5.519 |
| 7,073,803 B2 * | 7/2006 | Huth | ........... | 280/124.159 |
| 7,219,779 B2 * | 5/2007 | Bauer et al. | ........... | 188/266 |
| 7,497,452 B2 * | 3/2009 | Schedgick | ........... | 280/124.158 |
| 7,726,665 B2 * | 6/2010 | Bitter | ........... | 280/5.502 |
| 7,735,838 B2 * | 6/2010 | Rades et al. | ........... | 280/5.507 |

FOREIGN PATENT DOCUMENTS

| | | |
|---|---|---|
| DE | 102 32 769 A1 | 2/2004 |
| DE | 103 37 601 A1 | 3/2005 |
| EP | 0 615 870 A1 | 9/1994 |
| EP | 1 232 882 A2 | 8/2002 |
| EP | 1 277 604 A2 | 1/2003 |
| EP | 1 508 461 A1 | 2/2005 |

* cited by examiner

*Primary Examiner* — Paul N Dickson
*Assistant Examiner* — Nicole Verley
(74) *Attorney, Agent, or Firm* — Roylance, Abrams, Berdo & Goodman, L.L.P.

(57) ABSTRACT

The hydropneumatic axle suspension for vehicles, especially the front axle thereof, cooperates with at least one suspension cylinder (10) connected to a hydraulic accumulator (26; 24) on both its ring side (14) and the piston side (12). The hydraulic accumulator (26; 24) is triggerable by control electronics (18) with the aid of a valve unit (30; 28) that can be allocated to the hydraulic accumulator (26; 24). The ring side (14) of the suspension cylinder (10) is connected to a pressure value sensor (DA-R) which transmits its measured pressure values to the control electronics (18). The pressure value sensor (DA-R) located on the ring side is connected to the discharge end (38) of the valve unit (30), which can be associated with the ring side (14) of the suspension cylinder (10).

5 Claims, 1 Drawing Sheet

HYDROPNEUMATIC AXLE SUSPENSION FOR VEHICLES

FIELD OF THE INVENTION

The invention relates to a hydropneumatic axle suspension for vehicles, in particular for their front axle interacting with at least one suspension cylinder. The cylinder is connected both with its ring side and with its piston side to a hydraulic accumulator which can be triggered by the control electronics by a valve unit assigned to it.

BACKGROUND OF THE INVENTION

Commercially available hydropneumatic axle suspensions have a level control. When the axle load increases, the vehicle body sinks due to the changing pressures in the respective suspension cylinder. A level control valve is then actuated until the piston sides of the suspension cylinders as hydropneumatic actuators have reached the original starting level again. As the axle load decreases, the body can be raised accordingly. The level control valve connects the piston chambers of the suspension cylinders in use at the time to the tank line of the fluid system until the original level is restored.

In a development of this idea, DE 102 32 769 A1 discloses a hydropneumatic axle suspension for vehicles with dramatically changing axle loads, in particular for front axles on truck tractors with hydraulic suspension cylinders connected to hydropneumatic accumulators, a suspension circuit of the piston chambers pressure-controlled by a level control and a pressure-controlled suspension circuit of the annuli. A load-sensing pump can be set via a control line (load sensing line) by a control pressure for generating pressure. A pressure control valve keeps the pressure level constant in the suspension circuit of the annuli. In this known solution, the pressure control valve is a proportionally controlled valve triggered by a control current from an electrical control device as control electronics to proportionally control the axle spring rate as a function of at least one sensor signal between the constant annulus pressure level in partial regions and, if necessary, to override a selectable constant pressure to represent a given axle spring rate.

In the illustrated known solution, the annulus pressure is proportionally controlled in partial regions between the constant annulus pressure levels for more rapid pressure matching of the suspension accumulator. A proportional valve is hydraulically connected such that there is load sensing control with pressure relief for a control pump. In the level position, the two suspension circuits of the piston and ring sides in the known solution are kept at the set pressure level free of leaks by two pressure-tight 2/2-way valves. In the level control process, those valves are switched accordingly so that the special resettable hydraulic check valves, which were necessary in the past, can be omitted. In addition to the automatic changing of the spring rate by automatic annulus pressure control, it is possible in the known solution to intentionally change the pressure level in the annulus as necessary by external intervention to be able to match the spring rate to the given operating conditions. To be able to transmit the current pressure values in the piston chambers of the two suspension cylinders to the control electronics, a pressure sensor is connected to them. The sensor is protected against overloading by the pressure limiting valve of the fluid system.

With the known solution, an inherently economical solution of small geometry is devised for the control block of an axle suspension enabling a high level of comfort and inputs with respect to the individual spring rate which is to be set. In spite of these advantages, the known solution, however, for triggering the system requires a proportional pressure control valve and a shuttle valve which must transmit the higher pressure prevailing in one fluid branch to the control line (load-sensing line) for triggering a load-sensing pump. In addition to the two 2/2-way valves, additional valve components are required. These additional valve components are expensive and can also endanger the operating reliability of the axle spring control by their failure.

SUMMARY OF THE INVENTION

An object of the invention is, while retaining the advantages of the most similar known solution, to provide an improved hydraulic axle suspension with reduced costs and increased operating reliability, while omitting additional valves.

This object is achieved by a hydropneumatic axle suspension where the ring side of the suspension cylinder is connected to a pressure sensor which transmits its measured pressure values to the control electronics. The ring-side pressure sensor is connected to the output side of the valve unit assigned to the ring side of the suspension cylinder. Both the shuttle valve and the proportional pressure control valve of conventional suspensions can be omitted. This omission helps cut production and maintenance costs. The actual triggering takes place with commercial 2/2-way valves enabling economical implementation of the circuit, which valves are considered highly reliable.

In the known generic solution, the proportional pressure control valve is used to set the ring-side pressure. For each activation of the level control, the ring-side pressure on the suspension cylinder also is reset, with the result that unintentionally existing leakage flows can enter as a disadvantageous factor. In the suspension according to the invention, for a comparable suspension characteristic it is based on a constant pressure on the ring side of the suspension cylinder in the respective level position. Then, compared to known solutions, a correction of the ring-side pressure is not necessary. Only when the suspension characteristic changes is the ring-side pressure briefly changed, so that fewer leakage losses arise. Nor is adaptation of the hydraulics to different ring pressures necessary, since the ring-side pressures are "set" accordingly as parameters in the software of the control electronics.

In addition to other advantages arising from the reduced number of control and switching valves, the invention permits checking the precharge pressure $p_0$ in the hydropneumatic accumulators so that regular testing with the otherwise necessary measurement engineering effort can be eliminated. Depending on length of operation of the accumulators used and the frequency of their actuation, a working gas travels from the gas side of the accumulator to its fluid side. The accompanying losses leading to a reduction of the precharge pressure $p_0$ in the accumulator adversely affect the working capacity of the entire hydraulic system. In the invention, the hydraulic system is first connected depressurized. As soon as a volumetric flow is routed to the hydropneumatic accumulator, the pressure jumps to the precharge pressure $p_0$ of the hydropneumatic accumulator and continues to rise according to the characteristic of this accumulator. This situation applies especially when the volumetric flow is supplied to the lower accumulator, that is, it is supplied to the ring-side accumulator. If in the implemented circuit a volumetric flow is supplied to the upper or piston-side accumulator, both hydropneumatic accumulators for the suspension cylinder are checked at the same time.

In one especially preferred embodiment of the hydropneumatic axle suspension, a pressure sensor is on the piston side of the respective suspension cylinder, load-dependent adjustment of the suspension characteristic is then possible. A path measurement sensor for the piston rod unit of a suspension cylinder facilitates the desired level regulation for the control electronics.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawing which forms a part of this disclosure and is not to scale.

DETAILED DESCRIPTION OF THE INVENTION

Figure 1:
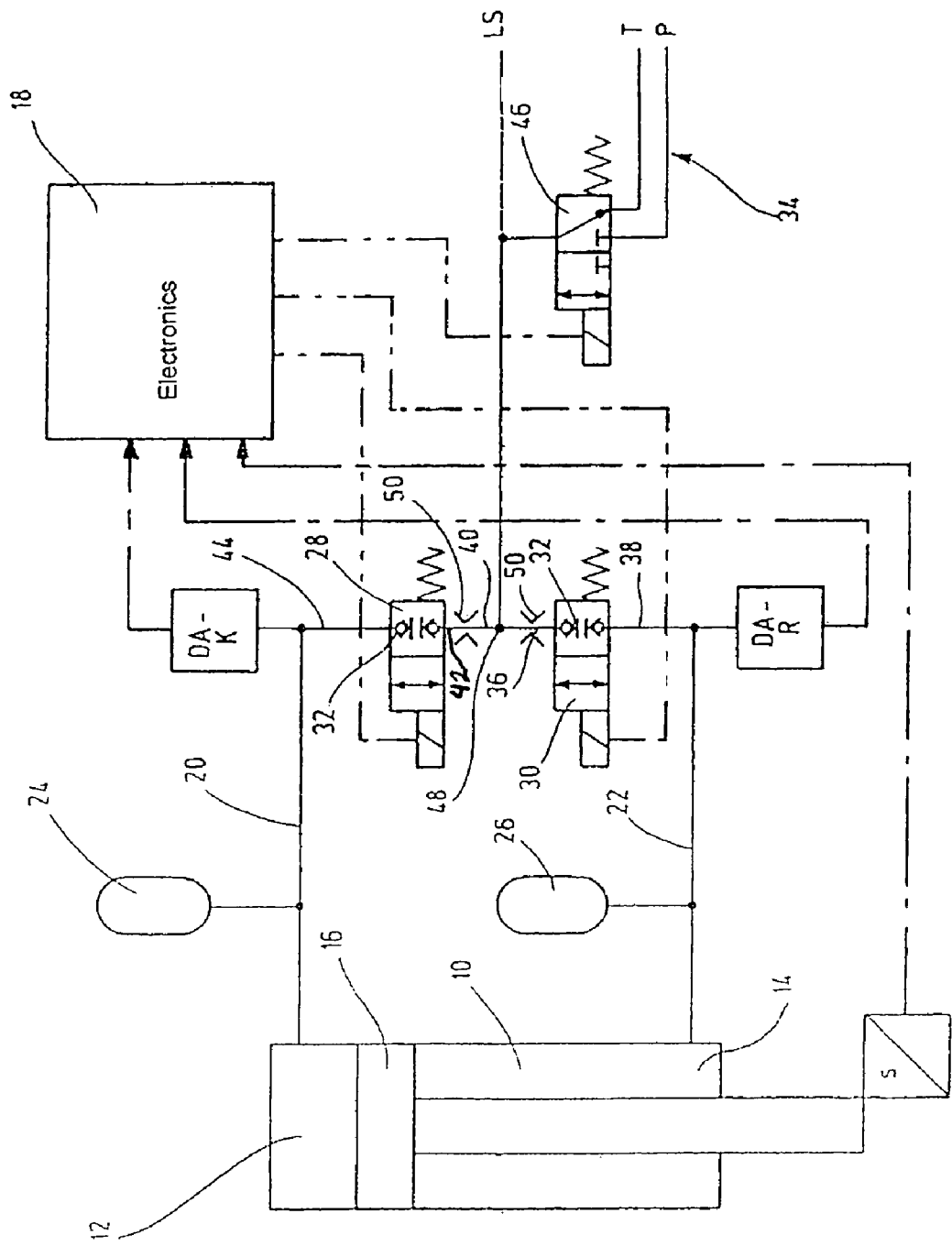
FIG. 1 is a block diagram schematically illustrating a hydropneumatic axle suspension circuit according to an exemplary embodiment of the invention.

The hydraulic circuit for a hydropneumatic axle suspension for vehicles shown in FIG. 1 is designed especially for a front axle (not detailed). This front axle interacts with at least one suspension cylinder 10, several, generally two suspension cylinders 10 being assigned to one axle of the vehicle. For the sake of simplicity, this hydropneumatic axle suspension is detailed only with respect to one suspension cylinder 10. The suspension cylinder 10 has one piston side 12 and one ring or rod side 14. The sides 12, 14 are separated from one another via a conventional piston rod unit 16. The respective position of the piston rod unit 16 can be detected via a path measurement system s with measured values transmitted to the control electronics 18.

Each of the piston side 12 and the ring side 14 is connected by a hydraulic supply line 20, 22 to a hydraulic accumulator 24, 26, also referred to as a hydropneumatic accumulator, accumulator or the like in the technical jargon, respectively. The hydropneumatic accumulators 24, 26 are shown only schematically, but they are of conventional design. In particular, within the accumulator housing a separating element, for example, in the form of an elastically pliable fluid membrane separates a gas storage chamber from a fluid chamber, which fluid chamber is connected to the line 20, 22 assigned to it to carry fluid. The piston-side pressure sensor DA-K and the ring-side pressure sensor DA-R are connected to the end of the respective supply line 20, 22 and transmit the measured pressure values to the control electronics 18.

For the hydropneumatic axle suspension according to the invention, two valve units 28, 30 made as 2/2-way valves can be actuated by the control electronics 18. These directional control or switching valves are conventional in the prior art, so that they will not be detailed here. As shown in the FIGURE, the respective valve unit 28, 30 is shown in its blocking position. Two check valves 32 acting hydraulically in opposition block fluid-tight the suspension cylinder 10 relative to a hydraulic supply unit 34.

The input side 36 of the valve unit 30, with an output side 38 connected to the ring side 14 of the suspension cylinder 10 is connected via a connecting line 40 to the input side 42 of the other valve unit 28. Valve unit 28 has an output side 44 connected to the piston side 12 of the respective suspension cylinder. The terminology referring to inputs and outputs is arbitrary and can be reversed as required by reversing the fluid direction. Relative to the fluid flow, the output side can then become the input side and the input side can become the output side. This terminology is chosen to be able to make reference relative to the interconnection.

A load-sensing line LS, made as a type of control line, can tap the respective hydraulic pressure prevailing in the connecting line 40 and discharges into the connecting line 40 between the two valve units 28, 30. Depending on the load situation established within the hydropneumatic axle suspension, the load sensing line LS then triggers a hydraulic pump P which is preferably a load sensing pump. To connect the pump P, a 3/2-way control valve unit 46 is used which can be triggered by the control electronics 18 and which connects the load sensing line LS to the tank T unpressurized, as shown in FIG. 1.

Into the connecting line 40 between the junction 48 of the load sensing line LS and the respective valve unit 28, 30, a cross-sectional constriction 50 in the form of a diaphragm, throttle or nozzle is provided.

With the illustrated hydraulic circuit in addition to the control electronics 18, with a few components for the implemented variable suspension for large axle loads correction of the ring-side pressure is only necessary when required, so that fewer leakage losses arise. This benefit leads to favorable performance results and to a reliable structure. The indicated circuit in terms of basic structure manages with only two valve units 28, 30. This arrangement mechanically simplifies the circuit, makes it economical and contributes to increasing the operating reliability. Furthermore, adaptation of the hydraulics to different ring pressures is not necessary, since acquired ring-side pressures from the pressure sensor DA-R are "set" directly as parameters into the software. The basic structure of the circuit also manages without a pressure sensor DA-K for the piston side 12. When using a pressure sensor DA-K, load-dependent setting of the suspension characteristic is additionally possible. The illustrated path measurement system s allows level control for the entire vehicle body, but is not absolutely necessary for actual ring-side pressure value detection.

The pressure $P_{RO}$ on the ring side 14 of the respective suspension cylinder 10 is given at the level position of the suspension. Depending on the geometrical cylinder dimensions and the accumulator parameters V0 and P0, the ring-side pressure changes when the cylinder position changes. If the piston rod unit 16 of the suspension cylinder 10 is retracted, the necessary volume on the ring side 14 is taken from the ring-side accumulator 26 and the ring-side pressure drops. If the piston rod unit 16 is extended, the displaced volume on the ring side 14 is taken up by the ring-side accumulator 26 and the ring-side pressure rises. The dependency of the ring-side pressure on position is detected and taken into account in the invention, for example, via the path measurement system. The ring-side pressure is measured, for example, by the pressure sensor DA-R as $P_{RM}$ and is compared to the theoretical ring-side pressure $P_{RS}$. The theoretical ring-side pressure $P_{RS}$ is determined from the following parameters:

Cylinder ring area $A_R$
Accumulator size $V_0$
Precharge pressure $P_0$
Ring-side specified pressure in level position $P_{RO}$
Cylinder position s The gas volume at the level position is then determined as follows:

$$V_1 \times P_{RO} = V_0 \times P_0$$

It follows therefrom:

$$V_1 = \frac{P_0}{P_{R0}} \times V_0$$

with $$\Delta V_{01} = A_R \times s \Rightarrow V_{gas\,s} = V_1 + \Delta V_{01}$$

$$V_{gas\,s} = V_1 + A_R \times s$$

$$P_{RS} \times V_{gas\,s} = P_{R0} \times V_1$$

$$P_{RS} = P_{R0} \times \frac{V_1}{V_1 + A_R \times s}$$

$$P_{RS} = P_{RM}$$

If the computed pressure $P_{RS}$ is equal to the measured pressure $P_{RM}$, no further correction is necessary. With the systems conventional to date, this relationship cannot be represented in this way.

While one embodiment has been chosen to illustrate the invention, it will be understood by those skilled in the art that various changes and modifications can be made therein without departing from the scope of the invention as defined in the appended claims.

What is claimed is:

1. A hydropneumatic axle suspension for vehicles, comprising:
    at least one suspension cylinder having a piston side and a ring side inside a housing thereof;
    a piston hydraulic accumulator connected in fluid communication with said piston side;
    a ring hydraulic accumulator connected in fluid communication with said ring side;
    a piston valve unit and a ring valve unit connected to and controlling fluid flow to said piston side and said piston hydraulic accumulator and to said ring side and said ring hydraulic accumulator, respectively, each of said valve units having an input side and an output side, said output side of said piston valve unit being connected in fluid communication to said piston side, said input side of said ring valve unit being connected in fluid communication by a connection line to said input side of said piston valve unit;
    control electronics connected to and triggering said piston valve unit and said ring valve unit;
    a ring pressure sensor, being connected in fluid communication to said ring side and electrically to said control electronics transmitting measured pressure values of said ring side to said control electronics, and being connected to said output side of ring valve unit; and
    a load sensing line opening into said connection line.

2. A hydropneumatic axle suspension according to claim 1 wherein
    a cross-section constriction is in said connection line between a junction of said connection line with said load sensing line and said ring valve unit.

3. A hydropneumatic axle suspension according to claim 1 wherein
    each of said piston valve unit and said ring valve unit comprises a 2/2-way valve with check valves oriented in opposite directions.

4. A hydropneumatic axle suspension according to claim 1 wherein
    a piston pressure sensor is connected in fluid communication to said piston side and electrically to said control electronics and transmits measured pressure values of said piston side to said control electronics.

5. A hydropneumatic axle suspension according to claim 1 wherein
    said suspension cylinder comprises a piston rod unit coupled to a path measurement system electrically connected to said control electronics to receive signals representative of positions of said piston rod unit.

* * * * *